Patented Mar. 8, 1932

1,848,323

UNITED STATES PATENT OFFICE

ALFRED H. DAVIES, OF NEW YORK, N. Y.; EDITH VAIL DAVIES EXECUTRIX OF SAID ALFRED H. DAVIES, DECEASED

COMPOSITION OF MATTER FOR USE IN METALLURGICAL OPERATIONS

No Drawing. Application filed May 4, 1928, Serial No. 275,265. Renewed May 26, 1931.

The present invention relates to a new composition of matter for use in metallurgical and chemical operations incident to the treatment of metals when in molten condition. One object thereof has been to provide a composition or combination of substances which when used in connection with or introduced into a mass of molten metal in predetermined quantities and under proper conditions will produce an ultimate product of definitely superior character and quality. For example, when my improved composition is used in producing iron and steel, the resulting metal possesses a novel and highly beneficial even distribution of all its elements and the amalgamation thereof in a substantially homogeneous mass. A very active beneficial effect accompanies the use of my improved composition which operates in part as a scavenging agent to eliminate or reduce the undesirable impurities and imperfections commonly encountered in commercial metals.

What I have referred to as the beneficial effect is in my opinion produced by the combined action of potassium chlorate and manganese dioxide, while the scavenging effect is produced by borax or boracic acid and/or sodium fluoride or soda ash. For the treatment of ordinary ferrous metals in which the characteristics vary chiefly with variation of the carbon content, I use a mixture of the above ingredients in the following proportions:

Potassium chlorate_____3 lbs. to 5 lbs.
Manganese dioxide_____¼ lb. to 1 lb.
Borax_____½ lb. to 2 lbs.
Sodium fluoride_____½ lb. to 2 lbs.

In the foregoing formula, I may use boracic acid wholly or partly in place of the borax and soda ash wholly or partly in place of the sodium fluoride. For gray iron in cupola and ladle and low carbon steel in blast furnace and ladle, my improved composition of matter will be introduced preferably into the molten metal while in the ladle in the proportion of from 1 lb. to 3 lbs. per ton of molten metal. The amount per ton of this charge will be diminished with increased tonnage. For example, for a 10-ton heat an effective charge would be 2 lbs. of composition per ton of metal. For a 112-ton heat an effective charge would be 1½ lbs. of composition.

In preparing my composition of matter for commercial use, I prefer to reduce the ingredients while in a dry state substantially to a powder of the fineness of 120 mesh. It is not essential that so fine a reduction be effected, but the action of the composition is more rapid and more widely distributed where the particles thereof are reduced to a relatively minute size. The charge can be administered in powdered form or in any other desired or convenient form, such as briquettes, packages or otherwise. However, I prefer to package predetermined amounts of the mixture in suitable containers such as metallic capsules, cans or cartridges, or in bags or cartons of paper or cloth to which a coating of paraffin or other moisture-resisting material is applied on the outer surface thereof. This tends to retain the powdered materials in practically dry condition and protects them from accidental wetting such as might easily take place in and about a large manufacturing plant or in transportation.

From the foregoing description, it will be apparent that no unusual technical difficulties are involved in the use of my improved composition. Iron and steel produced by methods which utilize this composition present a number of distinguishing and advantageous properties and characteristics over products of normal contemporary manufacturing practice. With the use of my invention these products are substantially free from occluded gases, free oxides and/or manganese sulphide, slags, segregations, piping and blow holes, and display a homogeneous, small close grain texture. Furthermore, by varying the ratio of elements in the composition and/or the amount of composition utilized, I am able to control the sulphur, phosporous and manganese content as well as the carbon content of a ferrous product. Other valuable and important advantages result directly or indirectly from the use of my composition either by reason of the characteristics of the improved metals produced, the simplification of the operations involved in their production, or both.

My composition may be introduced into the molten mass in various ways with favorable results. I prefer, however, in large iron and steel operations to confine appropriate quantities of composition in metallic containers or capsules which may be of gray iron or other suitable material. With gray iron a wall thickness of approximately ¼ inch is desirable. To treat a mass of molten iron or steel in the ladle, I press a charge-carrying capsule down through the mass to an underlying or bottom portion thereof and hold it there until the capsule disintegrates or is about to disintegrate. Thereupon the active charge is released into the metal. Important results are observed even where the composition is introduced by different methods as by dumping or depositing in loose form into the molten mass, throwing it into the ladle of metal in packages or briquettes, or securing a confined quantity in the ladle prior to pouring. But the preferred method hereinabove described adds materially to the effectiveness of the composition and makes it possible to secure as good or better results with smaller charges. For example, in ladle practice where my preferred method of administering is followed, the amount of charge will be substantially half of that indicated where the composition is thrown or dumped upon the surface of the metal. In cases where a charge is confined in a capsule or the like, it will be understood that the material and dimensions of the capsule will be such that the walls or some locking or releasable confining part thereof will be acted upon by the molten metal to release the reagent after a predetermined time of exposure to or in the molten mass.

I claim as my invention:

1. A composition of matter for use in metallurgical operations comprising potassium chlorate, borax, sodium fluoride and manganese dioxide.

2. A composition of matter for use in metallurgical operations comprising approximately 12 to 20 parts of potassium chlorate, 2 to 8 parts of borax, 2 to 8 parts of sodium fluoride, and 1 to 4 parts of manganese dioxide.

3. A composition of matter for use in the treatment of molten metals comprising potassium chlorate and manganese dioxide in intimate admixture with a concentrated scavenging agent.

4. A composition of matter for use in the treatment of molten metals comprising a concentrated oxygen liberating agent in intimate admixture with borax and sodium fluoride.

5. A composition of matter for use in metallurgical operations comprising alkali metal chlorate, borax, alkali metal fluoride and manganese dioxide.

6. A composition of matter for use in the treatment of molten metals comprising alkali metal chlorate, manganese dioxide and a scavenging agent.

7. The process of treating molten metals including subjecting the molten metal to the action of a mixture of potassium chlorate, manganese dioxide, sodium fluoride and borax.

8. The process of treating molten metals including subjecting the molten metal to the action of a mixture of an alkali metal chlorate, manganese dioxide, and a scavenging agent.

9. The process of treating molten metals including subjecting the molten metal to the action of a mixture of alkali metal chlorate, borax, alkali metal fluoride and manganese dioxide.

10. The process of treating molten metals including subjecting the molten metal to the action of a mixture of an oxygen liberating agent, borax and sodium fluoride.

11. The process as in claim 7 wherein the molten metal is a ferrous metal.

12. The process as in claim 8 wherein the molten metal is a ferrous metal.

13. The process as in claim 9 wherein the molten metal is a ferrous metal.

14. The process as in claim 10 wherein the molten metal is a ferrous metal.

In testimony whereof, I have signed my name to this specification this 19th day of April, 1928.

ALFRED H. DAVIES.